US012459097B2

(12) United States Patent
Baudrand

(10) Patent No.: US 12,459,097 B2
(45) Date of Patent: Nov. 4, 2025

(54) FASTENER DRIVING DEVICE

(71) Applicant: Illinois Tool Works Inc., Glenview, IL (US)

(72) Inventor: Olivier Baudrand, Valence (FR)

(73) Assignee: Illinois Tool Works Inc., Glenview, IL (US)

( * ) Notice: Subject to any disclaimer, the term of this patent is extended or adjusted under 35 U.S.C. 154(b) by 26 days.

(21) Appl. No.: 18/254,288

(22) PCT Filed: Dec. 7, 2021

(86) PCT No.: PCT/US2021/062205
§ 371 (c)(1),
(2) Date: May 24, 2023

(87) PCT Pub. No.: WO2022/132500
PCT Pub. Date: Jun. 23, 2022

(65) Prior Publication Data

US 2024/0009819 A1 Jan. 11, 2024

(30) Foreign Application Priority Data

Dec. 16, 2020 (EP) ..................................... 20214510
Dec. 16, 2020 (EP) ..................................... 20214514

(51) Int. Cl.
*B25C 1/08* (2006.01)

(52) U.S. Cl.
CPC .................................... *B25C 1/085* (2013.01)

(58) Field of Classification Search
CPC .................................. B25C 1/085; B25C 1/08
See application file for complete search history.

(56) References Cited

U.S. PATENT DOCUMENTS 32,452 A 5/1861 Phelps
3,523,489 A 8/1970 Perkins
(Continued)

FOREIGN PATENT DOCUMENTS

CA 2161907 A1 5/1996
EP 0251684 A1 1/1988
(Continued)

OTHER PUBLICATIONS

"International Search Report and Written Opinion" , from PCT/US2021/062205 , May 27, 2022.

*Primary Examiner* — Thomas M Wittenschlaeger
*Assistant Examiner* — Katie L Gerth
(74) *Attorney, Agent, or Firm* — Neal, Gerber & Eisenberg LLP

(57) ABSTRACT

A fastener driving device comprising a combustion chamber, a piston and a fastener channel. The piston is coupled to the combustion chamber and slidable within a sleeve such that combustion gas expansion causes the piston to slide from a first position to a second position. The fastener channel is configured to receive a fastener, wherein when moving from the first to the second position, the piston is configured to engage the fastener. In one embodiment the device comprises a return chamber for receiving gas from the sleeve via a first vent, and a second vent coupled to the return chamber and for supplying combustion gas from the combustion chamber to the return chamber. In another embodiment, the combustion chamber comprises a housing portion, wherein combustion gas expansion acts on the housing portion such that the housing portion moves to open the combustion chamber and exhaust combustion gases.

12 Claims, 11 Drawing Sheets

(56) References Cited

U.S. PATENT DOCUMENTS

| | | | | |
|---|---|---|---|---|
| 3,708,096 | A | 1/1973 | Burke | |
| 3,891,036 | A | 6/1975 | Schmidt | |
| 3,892,279 | A | 7/1975 | Amtsberg | |
| 4,040,554 | A | 8/1977 | Haytayan | |
| 4,075,850 | A | 2/1978 | Nakazato et al. | |
| 4,384,623 | A | 5/1983 | Galloni | |
| 4,401,251 | A | 8/1983 | Nikolich | |
| 4,403,722 | A | 9/1983 | Nikolich | |
| 4,483,473 | A | 11/1984 | Wagdy | |
| 4,483,474 | A | 11/1984 | Nikolich | |
| 4,522,162 | A | 6/1985 | Nikolich | |
| 4,523,646 | A * | 6/1985 | Doyle | B25C 1/008 173/15 |
| 4,549,344 | A * | 10/1985 | Nikolich | B25C 1/041 29/432 |
| 4,721,240 | A | 1/1988 | Cotta | |
| 4,784,308 | A * | 11/1988 | Novak | B25C 5/1624 227/120 |
| 4,909,419 | A | 3/1990 | Yamada et al. | |
| 4,913,331 | A | 4/1990 | Utsumi et al. | |
| 5,197,646 | A | 3/1993 | Nikolich | |
| 5,263,439 | A | 11/1993 | Doherty et al. | |
| 5,556,271 | A | 9/1996 | Zuercher et al. | |
| 6,006,975 | A * | 12/1999 | Ishizawa | B25C 1/003 227/138 |
| 6,135,871 | A * | 10/2000 | Jones | A22B 3/02 452/62 |
| 6,145,724 | A | 11/2000 | Shkolnikov et al. | |
| 7,013,985 | B2 | 3/2006 | Sasaki et al. | |
| 7,201,301 | B2 | 4/2007 | Moeller et al. | |
| 7,290,691 | B1 | 11/2007 | Wen | |
| 7,293,684 | B1 * | 11/2007 | Wen | B25C 1/045 227/8 |
| 7,296,721 | B1 * | 11/2007 | Wen | B25C 1/045 227/8 |
| 7,325,710 | B1 | 2/2008 | Wen | |
| 7,341,171 | B2 | 3/2008 | Moeller et al. | |
| 7,438,207 | B2 | 10/2008 | Wu et al. | |
| 7,448,524 | B1 * | 11/2008 | Liang | B25C 1/046 227/120 |
| 8,205,582 | B2 * | 6/2012 | Adams | F01L 21/00 123/46 R |
| 8,317,069 | B2 * | 11/2012 | Zhang | B25C 1/041 227/156 |
| 11,707,827 | B2 | 7/2023 | Zhao | |
| 2003/0127238 | A1 | 7/2003 | Largo | |
| 2003/0222113 | A1 | 12/2003 | Burke et al. | |
| 2004/0079302 | A1 | 4/2004 | Wolf et al. | |
| 2005/0098333 | A1 | 5/2005 | Lee | |
| 2006/0196682 | A1 | 9/2006 | Mcgee et al. | |
| 2007/0075113 | A1 | 4/2007 | Tillinghast et al. | |
| 2007/0131731 | A1 | 6/2007 | Moeller et al. | |
| 2008/0078799 | A1 * | 4/2008 | Wen | B25C 1/047 227/131 |
| 2008/0110333 | A1 * | 5/2008 | Adams | B25C 1/08 92/169.1 |
| 2008/0190988 | A1 | 8/2008 | Pedicini et al. | |
| 2008/0223900 | A1 | 9/2008 | Tanji | |
| 2008/0237295 | A1 * | 10/2008 | Adams | B25C 1/08 123/46 SC |
| 2008/0290131 | A1 * | 11/2008 | Liang | B25C 1/043 227/130 |
| 2009/0090759 | A1 | 4/2009 | Leimbach et al. | |
| 2009/0230166 | A1 | 9/2009 | Yamamoto et al. | |
| 2010/0065602 | A1 | 3/2010 | Zhao et al. | |
| 2010/0213235 | A1 | 8/2010 | Pedicini et al. | |
| 2010/0230461 | A1 | 9/2010 | Tanaka | |
| 2010/0327039 | A1 | 12/2010 | Adams | |
| 2011/0240709 | A1 | 10/2011 | Oouchi | |
| 2011/0290850 | A1 * | 12/2011 | Wu | B25C 1/04 227/130 |
| 2012/0067935 | A1 | 3/2012 | Liu | |
| 2013/0048696 | A1 | 2/2013 | Largo et al. | |
| 2013/0134204 | A1 | 5/2013 | Morioka et al. | |
| 2014/0090732 | A1 | 4/2014 | Schieler et al. | |
| 2015/0102084 | A1 * | 4/2015 | Zhao | B25C 1/08 227/140 |
| 2015/0202755 | A1 | 7/2015 | Tanji | |
| 2016/0151900 | A1 | 6/2016 | Wu et al. | |
| 2017/0036335 | A1 | 2/2017 | Largo et al. | |
| 2018/0169846 | A1 * | 6/2018 | Fan | B25C 1/18 |
| 2018/0222030 | A1 * | 8/2018 | Zhao | B25C 1/047 |
| 2018/0236645 | A1 * | 8/2018 | Fan | B25C 1/08 |
| 2019/0375084 | A1 | 12/2019 | Bierdeman et al. | |
| 2020/0114500 | A1 | 4/2020 | Bierdeman et al. | |
| 2020/0215673 | A1 * | 7/2020 | Weigmann | B25C 1/04 |
| 2023/0398671 | A1 * | 12/2023 | Fan | B25C 1/08 |

FOREIGN PATENT DOCUMENTS

| | | | |
|---|---|---|---|
| EP | 0251685 | A1 | 1/1988 |
| EP | 0252653 | A1 | 1/1988 |
| EP | 2142341 | A1 | 1/2010 |
| WO | 2018148007 | A1 | 8/2018 |

* cited by examiner

FASTENER DRIVING DEVICE

PRIORITY CLAIM

This application is a national phase application of PCT/US2021/062205, filed on Dec. 7, 2021, which claims priority to and the benefit of European Patent Application No. 20214514.0, which was filed on Dec. 16, 2020 and European Patent Application No. 20214510.8, which was filed on Dec. 16, 2020, the entire contents of each of which are incorporated herein by reference.

TECHNICAL FIELD

The present disclosure relates to a fastener driving device and particularly to a fastener driving device including a combustion chamber and a positive air return system.

BACKGROUND

Combustion powered fastening devices use the expansion of gases generated during an explosion within a combustion chamber to drive a piston. The piston then drives a fastener (for example a nail) from the device into an external object (for example a wall). The piston must then return to its original position in order for a second fastener to be loaded and driven.

Incomplete piston return can result in a blank fire or misfire. The device may then have to be manually reset in order to fire again. A blank or misfire can therefore cause delays in firing fasteners. Additionally, the need for a manual reset can expose the user to risk, in the event of uncontrolled firing of a fastener.

It is an aim of certain examples of the present disclosure to solve, mitigate or obviate, at least partly, at least one of the problems and/or disadvantages associated with the prior art. Certain examples aim to provide at least one of the advantages described below.

BRIEF SUMMARY

According to a first example of the present disclosure there is provided a fastener driving device comprising: a combustion chamber; a piston coupled to the combustion chamber and slidable within a sleeve such that combustion gas expansion in the combustion chamber causes the piston to slide from a first position to a second position; a fastener channel configured to receive a fastener, wherein when moving from the first position to the second position the piston is configured to engage the fastener and drive it from the device; and a return chamber configured to receive gas from the sleeve via a first vent; wherein the device comprises a second vent coupled to the return chamber and configured to supply combustion gas from the combustion chamber to the return chamber.

The second vent may include a one way valve, such that gas from the return chamber is prevented from returning via the second vent.

At least one of the first and second vents may be connected to a channel for coupling the sleeve to the return chamber.

When the piston moves from the first position to the second position gas pressure within the return chamber may be increased. Gas returning from the return chamber to the sleeve via the first vent may be configured to bias the piston towards the first position.

The return chamber may be fluidly connected to the fastener channel via a nose leak channel, the piston being configured such that in the first position the nose leak channel is open and in the second position the nose leak channel is closed.

The piston comprises a plate configured to abut an interior wall of the sleeve and a drive blade extending from the plate into the fastener channel to engage the fastener.

The first and second vents may be spaced apart upon the sleeve such that when the piston moves towards the second position, the piston slides past the second vent before reaching the first vent.

According to a second example of the present disclosure there is provided a fastener driving device comprising: a combustion chamber comprising a moveable housing portion; a piston coupled to the combustion chamber such that combustion gas expansion in the combustion chamber causes the piston to slide from a first position to a second position; and a fastener channel configured to receive a fastener, wherein when moving from the first position to the second position the piston is configured to engage the fastener and drive it from the device; wherein combustion gas expansion in the combustion chamber acts on the moveable housing portion such that the moveable housing portion moves in a first direction to open the combustion chamber and exhaust combustion gases.

The biased wall portion may comprise a first surface and an opposed second surface, the first surface being larger than the second surface such that combustion gas expansion exerts a greater force upon the first portion causing the moveable housing portion to move.

The first direction may be transverse to a plane of the first surface.

The device may further comprises a biasing element arranged to bias the moveable housing portion in a second direction opposite to the first direction to close the combustion chamber.

The device may further comprise a return chamber configured to receive gas from the sleeve via a first vent as the piston slides from the first position to the second position and to return gas to the sleeve to bias the piston towards the first position.

The device may further comprise a second vent coupled to the return chamber and configured to supply combustion gas from the combustion chamber to the return chamber.

The second vent may include a one way valve, such that gas from the return chamber is prevented from returning via the second vent.

When the piston moves from the first position to the second position gas pressure within the return chamber may be increased. Gas returning from the return chamber to the sleeve via the first vent may be configured to bias the piston towards the first position.

BRIEF DESCRIPTION OF THE DRAWINGS

Examples of the present disclosure are further described hereinafter with reference to the accompanying drawings, in which.

DETAILED DESCRIPTION

Figure 1:
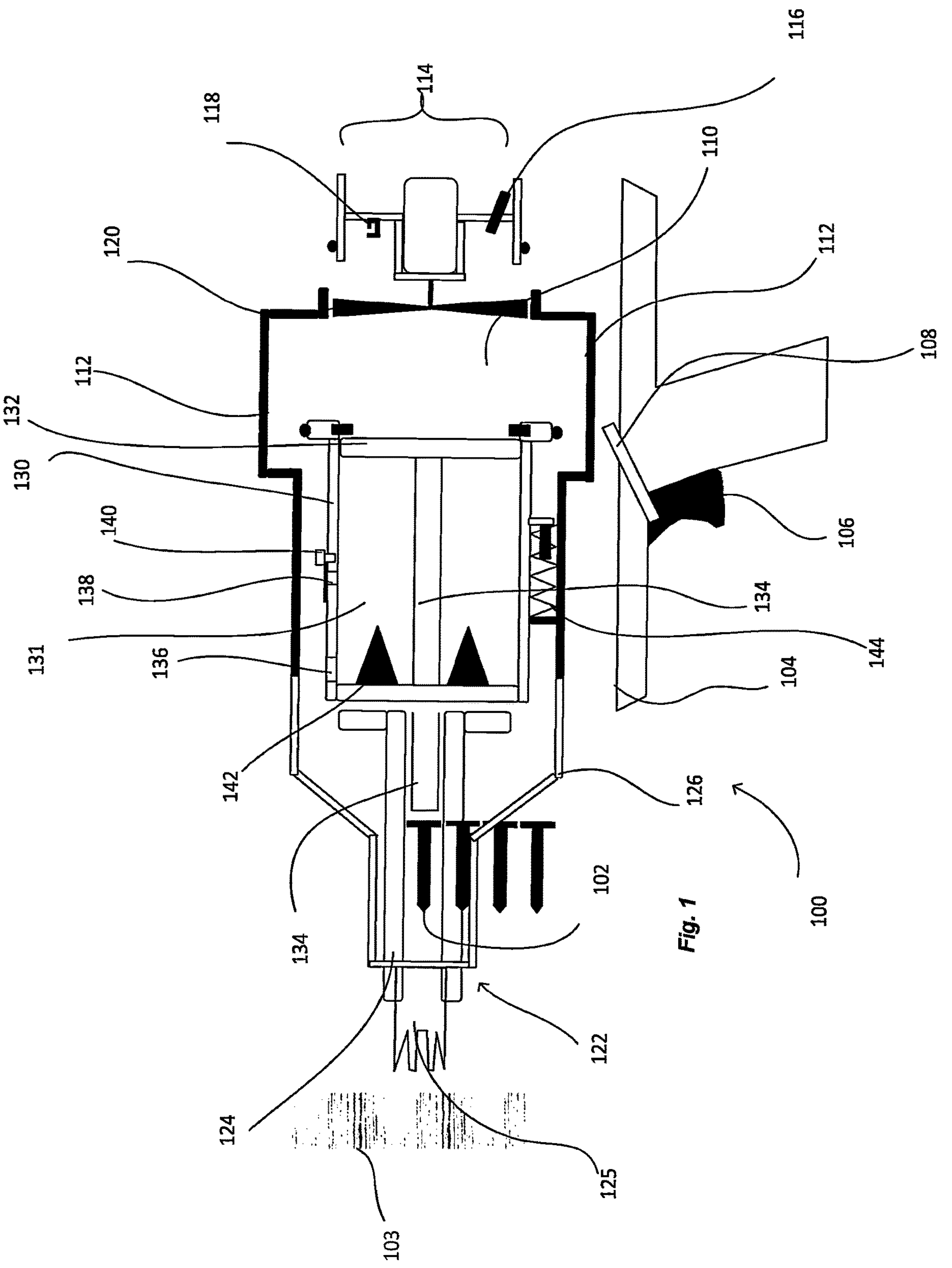
FIG. 1 illustrates a schematic view of an example fastener driving device according to the prior art.

Referring now to FIG. 1 a fastener driving device 100 according to the prior art is shown. FIGS. 2*a* to 2*i* show the process of driving a fastener 102 (for instance, a nail) from the fastener driving device 100.

The fastener driving device 100 may include an exterior housing 104. The exterior housing 104 encloses at least some of the components of the fastener driving device 100. The fastener driving device may also include a trigger 106. In some examples the trigger 106 may be attached to a chamber lockout 108, the purpose of which is explained below in connection with FIG. 2*b*.

The fastener driving device 100 includes a combustion chamber 110 defined by a combustion chamber housing 112. The combustion chamber housing 112 is slidable within the fastener driving device 100. For example, the combustion chamber housing 112 can slide in a direction towards a combustion mechanism 114 and in a direction away from the combustion mechanism 114. The movement of the combustion chamber housing 112 may also be aligned with the direction in which a fastener is driven from the device 100. In this example the combustion mechanism 114 includes a fuel injector 116 and a spark plug 118. The fastener driving device 100 further includes a fan 120 which is configured to disperse fuel injected by the fuel injector 116.

As shown in FIG. 1 the fastener driving device 100 includes a nose portion 122. The nose portion 122 includes a fastener channel 124 and a probe 126. A fastener 102 can be received in the fastener channel 124. The nose portion 122 includes a work contact element 125 to direct the fastener 102 (that is, to allow the user to determine where the fastener 102 is to be driven into an external surface 103). The work contact element 125 may be integral with the probe 126 such that they move together. Furthermore, only when the work contact element 125 is pressed against an external surface 103 can the fastener driving device 100 be fired. The work contact element 125 being pressed against the external surface 103 may trigger a switch (not shown) to allow the fastener driving device 100 to fire, for example. As will be explained below, when the work contact element 125 is pressed against the external surface 103 it is depressed into nose portion 122, which activates the firing mechanism and is a necessary condition for a fastener 102 to be discharged. Accordingly, the work contact element 125 also serves as a mechanism by preventing a fastener 102 from being fired other than directly into an external surface 103.

The probe 126 may extend toward the combustion chamber housing 112. In this way the probe 126 is integral with or coupled to the combustion chamber housing 112. The probe 126 may form part of the walls of the combustion chamber 110.

Figure 2A:
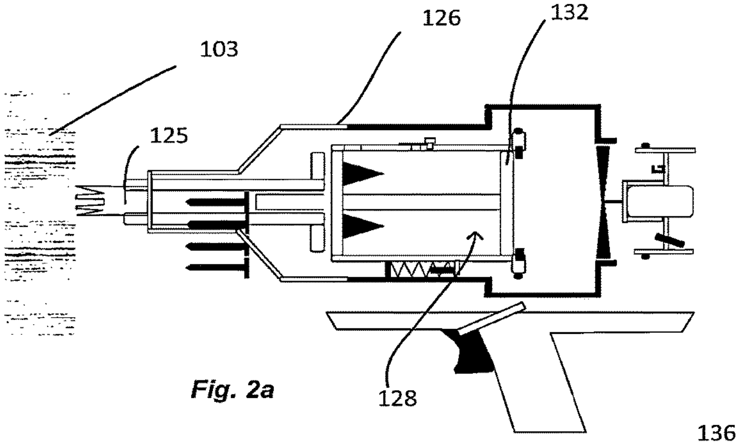
FIGS. 2*a* to 2*i* illustrate schematic views of the fastener driving device of FIG. 1 driving a fastener.
Figure 2B:
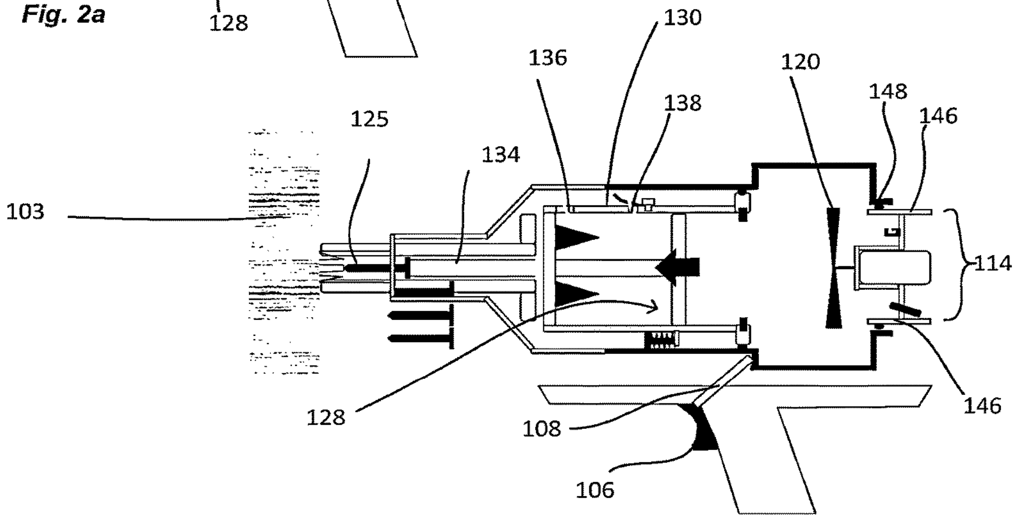
Figure 2C:
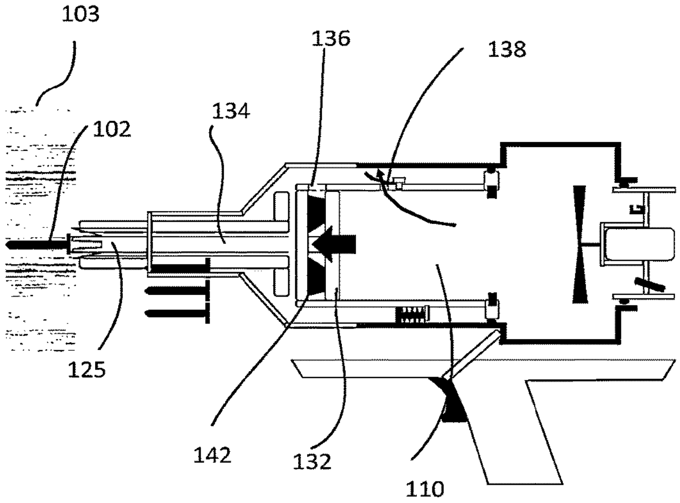

As shown in FIGS. 2*a* and 2*b* when the work contact element 125 is pushed against an external surface 103 the work contact element 125 moves into the nose portion 122. The probe 126 in turn pushes against the combustion chamber housing 112, such that the combustion chamber 110 slides back away from the work contact element 125. The combustion chamber housing 112 then forms a sealed combustion chamber (sealed with O-rings or other forms of seal) with the combustion mechanism 114, shown in FIG. 2*b*. The fastener driving device 100 will not fire until the combustion chamber housing 112 has been slid such that combustion chamber 110 is sealed. Owing to the coupling between the probe 126 and the combustion chamber housing 112, pressing the work contact element 125 against the external surface 103 directly closes the combustion chamber 110, thus only permitting the device 100 to be fired when in a firing position. The pulling of the trigger 106 when the combustion chamber 110 has moved into the sealed position allows the chamber lockout 108 to engage with the combustion chamber housing 112. This prevents return of the combustion chamber 110 during firing. Also, until the work contact element 125 has been depressed and the combustion chamber housing 112 has slid back, the chamber lockout 108 will not be able to move back when the trigger 106 is pulled (this being evident by comparison of FIGS. 2*a* and 2*b*). Accordingly, until the device 100 is in a firing position, the trigger 108 cannot be fully pulled to activate the firing mechanism.

In this example the combustion chamber housing 112 contacts a sealing element 148 on a wall 146 of the combustion mechanism 114. This then triggers the fan 120 to start and fuel is injected into the combustion chamber 110 and dispersed by the fan 120. When the trigger 106 is subsequently pulled the spark plug 118 ignites the fuel. By injecting fuel as soon as the combustion chamber 110 is closed, rather than waiting until the trigger 106 is pulled, firing delay is minimised.

The combustion of the fuel results in a temperature increase, which increases the volume and therefore the pressure of gas within the sealed combustion chamber 110. The expansion of the combustion gases within the combustion chamber 110 acts upon a face of piston 128 which faces into the combustion chamber 110. Gas pressure in the combustion chamber 110 drives the piston 128 from a first position (shown in FIG. 2*a*) toward the second position (shown in FIG. 2*c*). FIG. 2*b* shows piston 128 in an intermediary position. The gases may do this by exerting force on a plate 132. The plate 132 can be sized to contact the interior walls of a sleeve 130 so as to form a seal between the sleeve 130 and the combustion chamber 110. As the piston 128 moves within the sleeve 130 gases contained within the sleeve 130 escape via a vent 136 and an exhaust 138 (illustrated by the arrows in FIG. 2*b*). In some examples, the sleeve 130 may include a plurality of vents 136 and/or exhausts 138 around the perimeter of the sleeve 130. The exhaust 138 may not be present in every example.

The sleeve 130 may include a bumper 142 or other resilient device or in some cases a plurality of bumpers 142. The bumpers 142 are positioned in the sleeve 130 so that the bumpers 142 are impacted upon when the piston 128 moves to the second position. In this way the bumpers 142 are at an end of the sleeve 130 and provide protection from any impact forces of the piston 128 to that end of the sleeve 130. The bumpers 142 further serve to encourage the return of piston 128 towards the first position as they rebound.

The piston 128 includes a drive blade 134 extending from the plate 132 towards a fastener 102 located in a fastener channel 124 defined within the nose portion 122. The drive blade 134 sits partially within the fastener channel 124 and therefore slides within it. During firing, the plate 132 pushes the drive blade 134, which then contacts the fastener 102 and pushes it from the fastener driving device 100, through the fastener channel 124.

The drive blade 134 may pass through the base of the sleeve 130 into the fastener channel 124. In this example a sealing O-ring is positioned at the end of the sleeve around the drive blade 134 to prevent gases escaping the sleeve 130 around the drive blade 134.

The exhaust 138 is spaced apart from the vent 136. In this example, the exhaust 138 is positioned on the sleeve 130 closer to the combustion mechanism 114 than the vent 136. The exhaust 138 may include a one-way valve 140. The one-way valve 140 covering the exhaust 138 is orientated such that gas can move out of the sleeve 130 or combustion chamber 110 (dependent on the position of the piston 128) but not enter either the combustion chamber 110 or the sleeve 130.

Before the piston 128 reaches the second position, the plate 132 of the piston 128 moves past the exhaust 138. This allows the combustion gases to escape from the combustion chamber 110 via the exhaust 138, which partially reduces the gas pressure in the combustion chamber 110. At this time the piston 128 has already been fully accelerated and will continue to move towards the second position even under the reduced gas pressure.

Figure 2D:
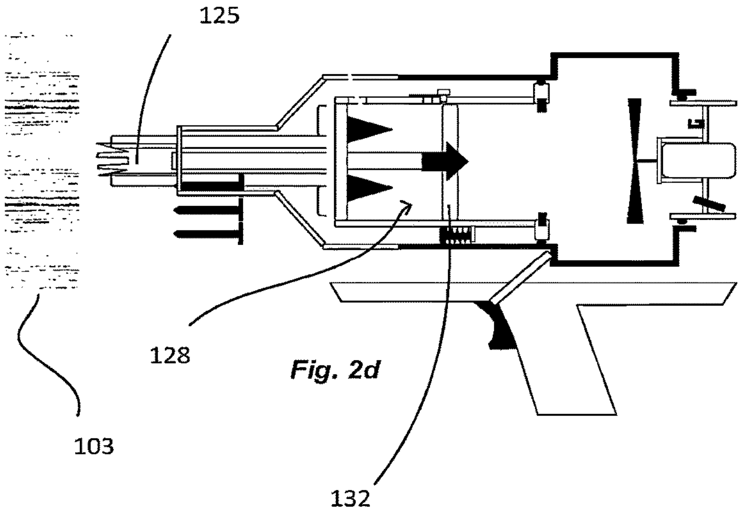
Figure 2E:
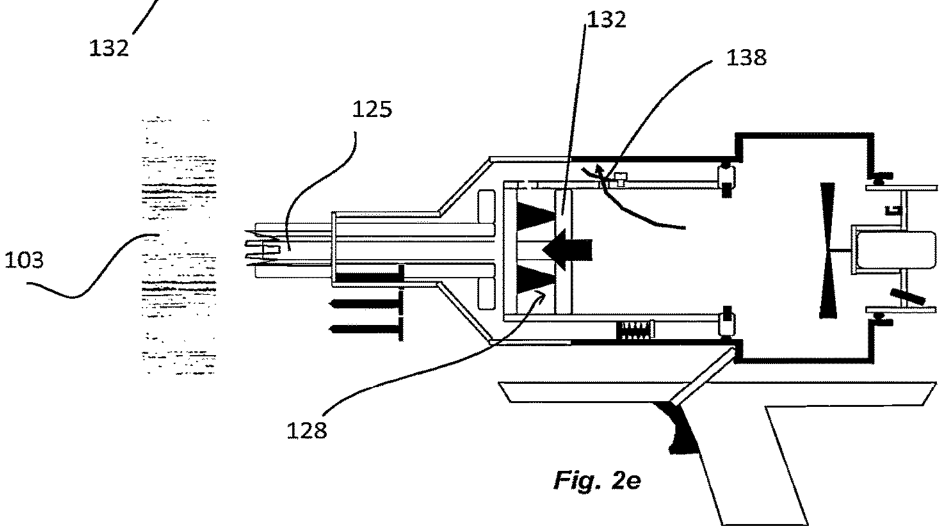

When the piston 128 is in the second position the plate 132 impacts upon the bumpers 142. In some examples the plate 132 may then rebound from the bumpers 142 and then impact the bumpers 142 a second time, as is shown in FIGS. 2*d* and 2*e*. A piston rebound is an undesired event. For example, piston rebound can lead to double drive blade impact on the external surface, which may be unsightly or against building regulations. In some cases a large rebound can lead to double fastener fire by engagement of a further fastener in the channel. Furthermore, piston rebound can affect the exhaust efficiency of the burned combustion gases because the piston 128 moves towards the first position during the rebound and so moves past the exhaust 138. In this way no combustion gases can be exhausted from the combustion chamber 110 during at least a portion of the piston rebound. Moreover a piston rebound increases the return piston time which decreases shot-to-shot speed.

Figure 2F:
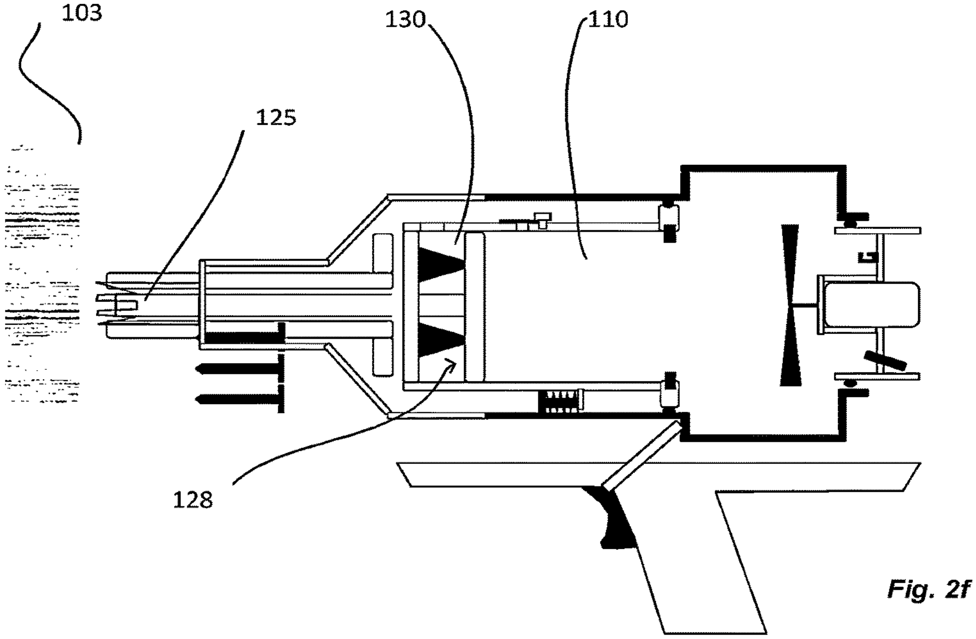
Figure 2G:
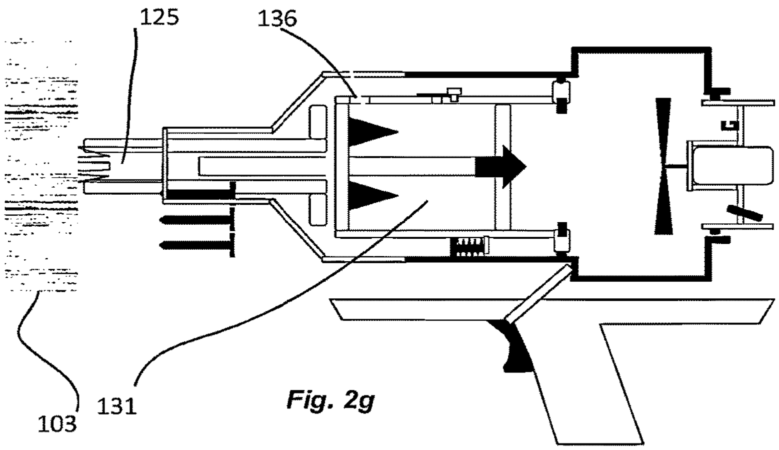

FIG. 2*f* shows the piston 128 in the second position. The second position may be where the plate 134 is in contact with the bumpers 142, for example. In the combustion chamber 110, once the fuel has been combusted, the gases in the combustion chamber 110 cool, which creates a vacuum. The exhaust 138 having a one-way valve 140 prevents gases retuning to the combustion chamber 110. The vacuum therefore encourages piston 128 to slide towards the first position. As vent 136 does not include a one-way valve, gas can re-enter the sleeve 130 via the vent 136 as shown by the arrow in FIG. 2*g*. In the figures the probe 126 is extending around the sleeve 130. However, probe 126 may not be continuous around the circumference of sleeve 130: it may include gaps or comprise only a think element coupling the work contact element 125 with the combustion chamber wall 112. Accordingly, vent 136 and exhaust 138 effectively communicate with the ambient environment outside of the device 100.

Figure 2H:
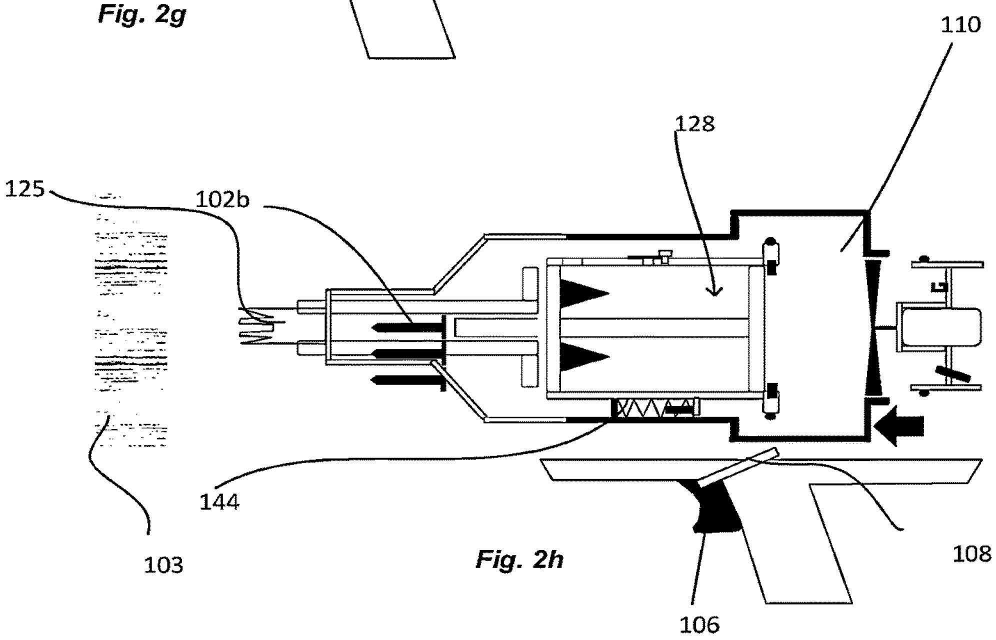
Figure 2I:
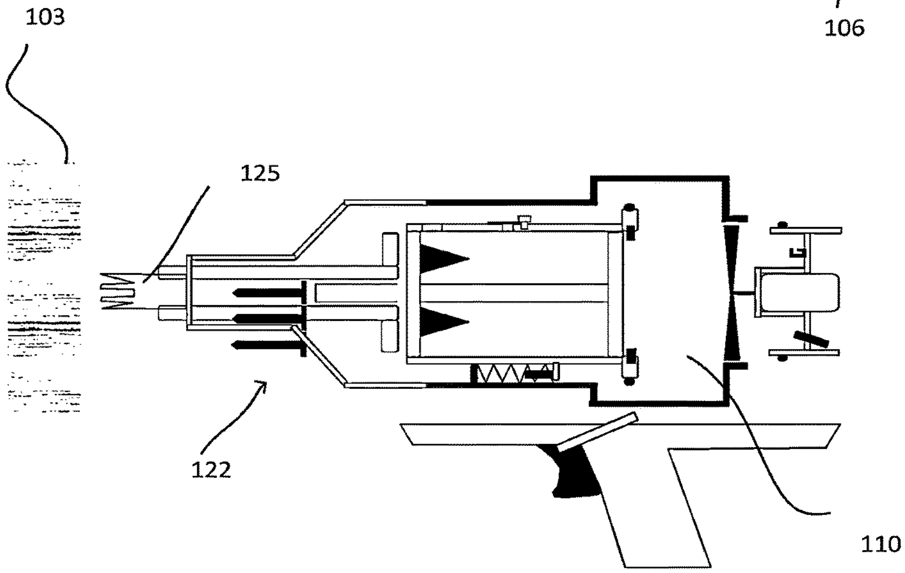

As shown in FIG. 2*h*, the fastener driving device may also include a chamber spring 144. The chamber spring 144 may be attached to the combustion chamber housing 112 so as to provide a biasing force against the sliding motion of the combustion chamber 110. That is, when the combustion chamber 110 is moved by the probe 126, such that the combustion chamber 110 is sealed, the spring 144 is compressed. After the fastener 102 is fired the device 100 may be moved away from the external surface 103 by the user. When the trigger 106 is released by the user (releasing lockout 108) spring 144 acts to move the combustion chamber 110 into its initial position as indicated by the arrow. This opens the combustion chamber 110 by the wall 112 separating from seal 148 about the combustion mechanism 114 to allow for air scavenging (that is, fresh air replenishing the combustion chamber 110). A second fastener 102*b* is drawn into nose 122 and aligned for firing the next shot shown in FIG. 2*i*. The mechanism for supplying fasteners 102 may be entirely conventional and so will not be further described.

Movement of the combustion chamber wall 112 may also open the combustion chamber 110 about the outside of sleeve 130 (the side of the combustion chamber 110 opposite to the combustion mechanism 114). When the work contact element 125 is depressed, this side of the combustion chamber wall 112 is also sealed by an O-ring about the sleeve 130.

The cycle for firing a fastener 102 requires a period of driving the fan 120, plus additional time to spark and ignite the fuel. To allow for piston 128 to move to the second position and return to the first position the trigger 106 is disabled to prevent an attempt at a further shot. The trigger 106 may be electronically disabled, that is a switch detection may be ignored when the trigger 106 is disabled. Once the combustion chamber 110 is opened a period of scavenging time is required. The cycle duration from the pressing of the work contact element 125 against the external surface to the fastener driving device 100 being ready for the next shot is therefore typically between 300 ms and 500 ms.

Figure 3:
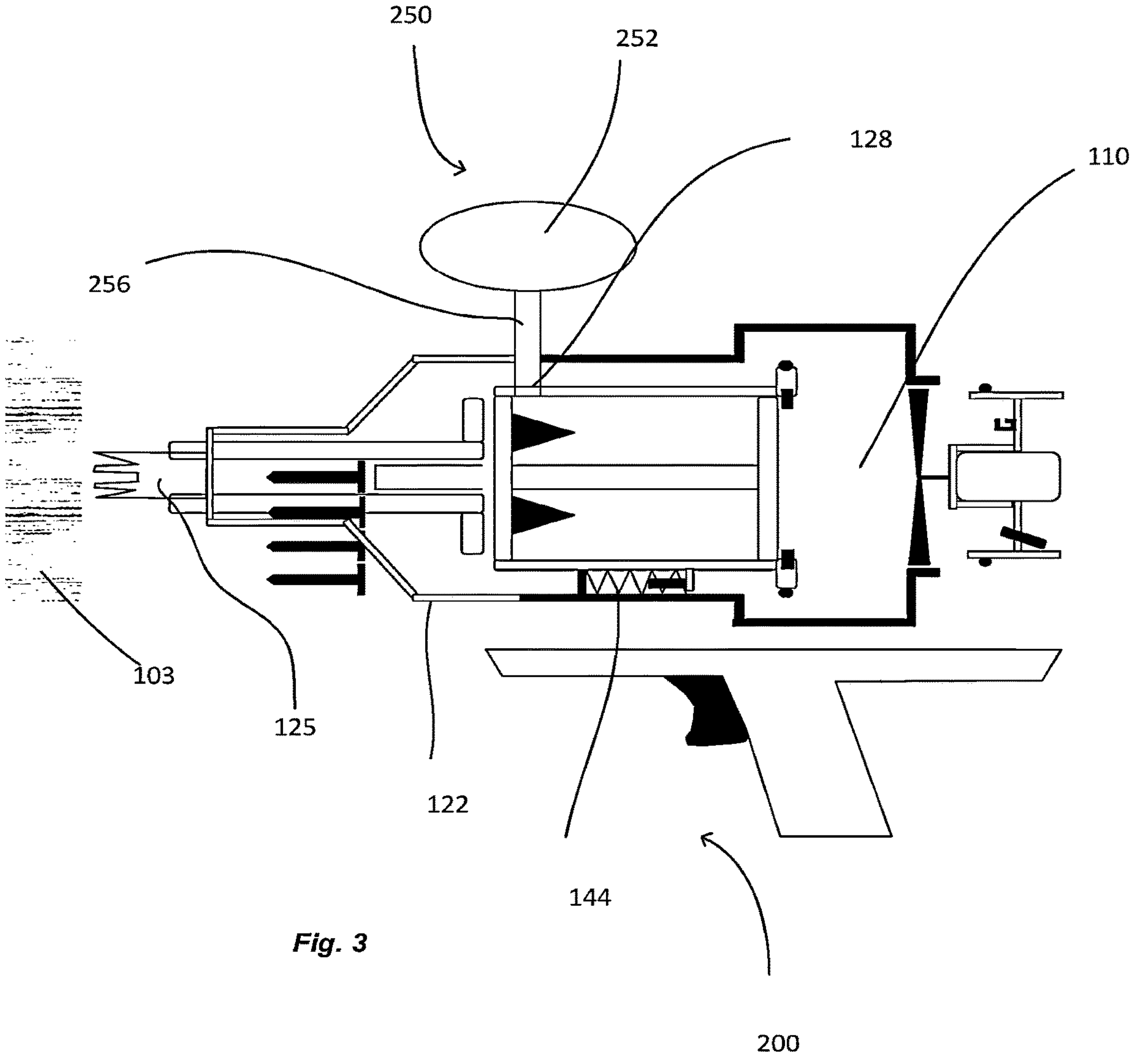
FIG. 3 illustrates a fastener driving device with a positive air return system according to the prior art.

To reduce the cycle time FIG. 3 shows an example of a fastener driving device 200 which includes a positive air return system 250. The positive air return system 250 includes a return chamber 252 which is in communication with the sleeve 130 via a channel 256 and the vent 136. During firing of the fastener 102, the expansion of the combustion gases slides the piston 128 from the first position to the second position. This causes gases within the sleeve 130 to enter the return chamber 252, which pressurises it.

After the fastener 102 is fired into the external surface 103, the fastener driving device 200 recoils is moved by the user away from the external surface 103. The combustion chamber 110 opens as previously described. That is, when the fastener driving device 200 is moved away from the external surface 103 the spring 144 pushes probe 126 and hence the work contact element 125 from the nose portion 122 and moves the combustion chamber wall 112 to open the combustion chamber 110. The pressurised gas within the return chamber 252 then acts on the piston 128 to return it to the first position.

The use of a positive air return system 250 increases the speed of return of piston 128 from the second position to the first position (by providing positive pressure to piston 128 driving it to the first position in addition to the suction generated by the vacuum as the combustion gases cool). This allows for less time between successive cycles. However, to provide enough return force to drive the piston 128 back a large return chamber 252 is required. This can affect the line of sight of a user to the external surface 103 where the fastener 102 is to be applied past the fastener driving device. Additionally a large vent 136 in the sleeve 130 is needed (to allow gas to flow in and out of the return chamber rapidly), which can reduce the structural strength of the sleeve 130.

Figure 4A:
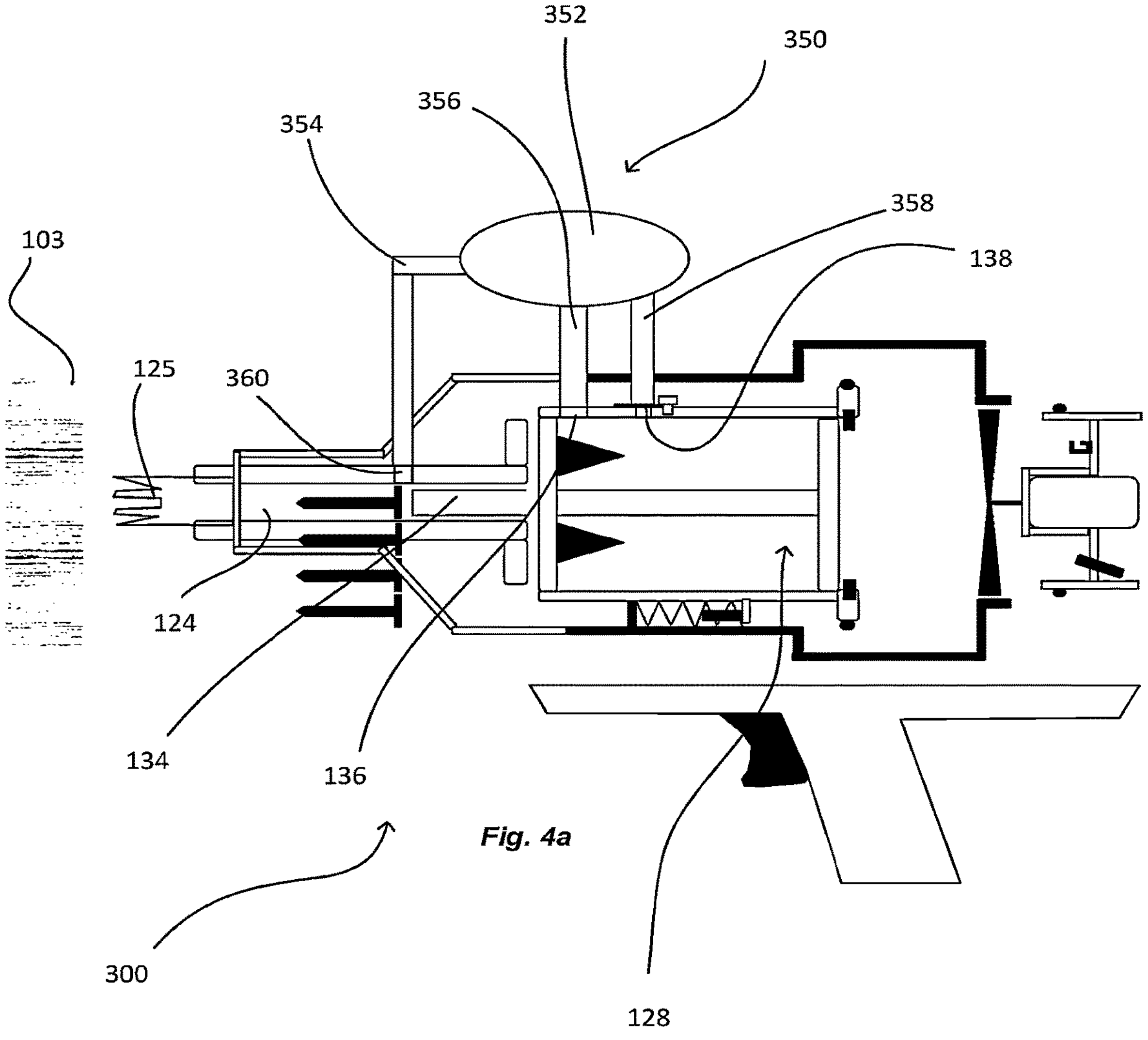
FIGS. 4*a* to 4*d* illustrate schematic views of a fastener driving device according to a first example of the present disclosure.

Referring now to FIG. 4*a* a fastener driving device 300 according to a first example of the present disclosure is shown with an improved positive air return system 350. For brevity the features of the fastener driving device 300 which are the same as described above will not be described again.

The positive air return system 350 includes a return chamber 352. The return chamber 352 is configured to receive gas from the sleeve 130 and additionally from combustion chamber 110 via the vent 136 and an exhaust 138. Vent 136 may be referred to as a first vent and exhaust 138 may be referred to as a second vent. In some examples the return chamber 352 may surround the nose portion 122, for example in a doughnut shape, in order to make it less obstructive for the user trying to view the external surface 103.

In this example the exhaust 138 is connected to the return chamber 352 via a first channel 358. The vent 136 is connected to the return chamber 352 by a second channel 356. In examples where the sleeve 130 includes a plurality of vents 136 and/or exhausts, each vent and/or exhaust may be connected by a plurality of channels 356, 358. In some cases the return chamber 352 may be partly defined by the wall of sleeve 130 such that no channels are required: the or each vent 136 and exhaust 138 opening directly into the return chamber 352. The skilled person will appreciate that the physical disposition of the return chamber 352 and the remainder of the device 100 is not critical, only how gas is supplied to the return chamber 352 and subsequently returned to sleeve 130, as will now be described.

Figure 4B:
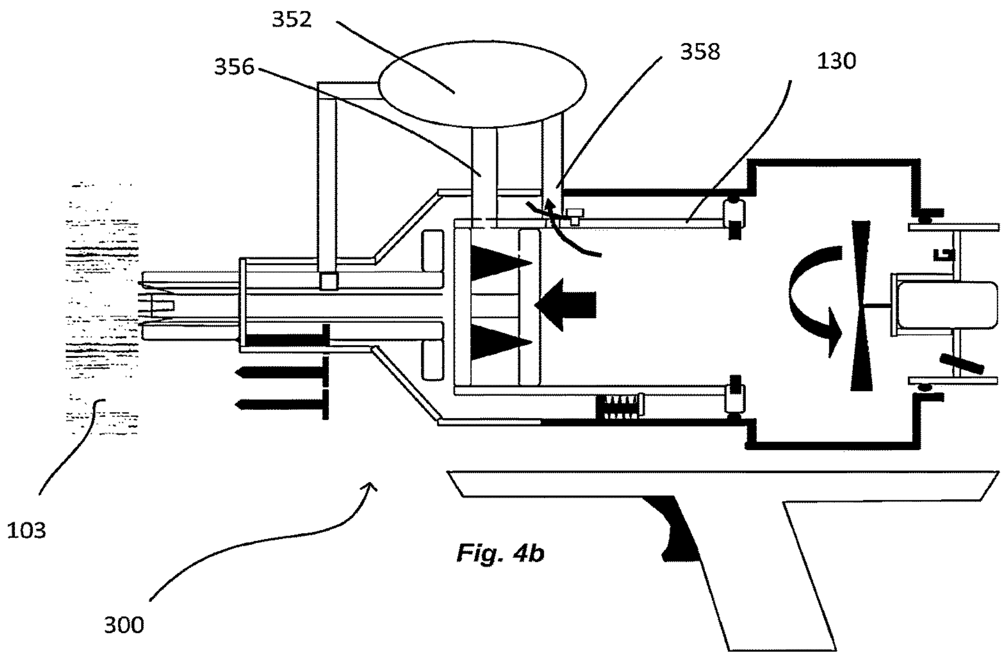

FIG. 4*b* shows the piston 128 sliding to the second position as a result of combustion gas expansion in the combustion chamber 110 (as described above). The piston 128 slides in a direction away from the combustion mechanism 114 and gas within the sleeve 130 therefore escapes into the return chamber 352 via the vent and second channel 356 as indicated by the arrow. In the first portion of travel of the piston 128, compressed gas in sleeve 130 will also pass to the return chamber 352 via the exhaust 138. Once the plate 132 of the piston 128 has moved past the exhaust 138 towards the second position, heated combustion gases flow into the return chamber 352 from the combustion chamber 110 via the exhaust 138 and first channel 358 as indicated by the arrow. The heated combustion gases further pressurise the return chamber 352 compared to the return chamber 252 of FIG. 3. The increased pressurisation within the return chamber 252 allows for a more effective piston return because the combustion gas pressure exceeds the pressure of gas driven into the return chamber 352 by movement of the piston 128 within sleeve 130. Additionally or alternatively the return chamber 352 size can be reduced, resulting in more streamlined device 100.

Figure 4C:
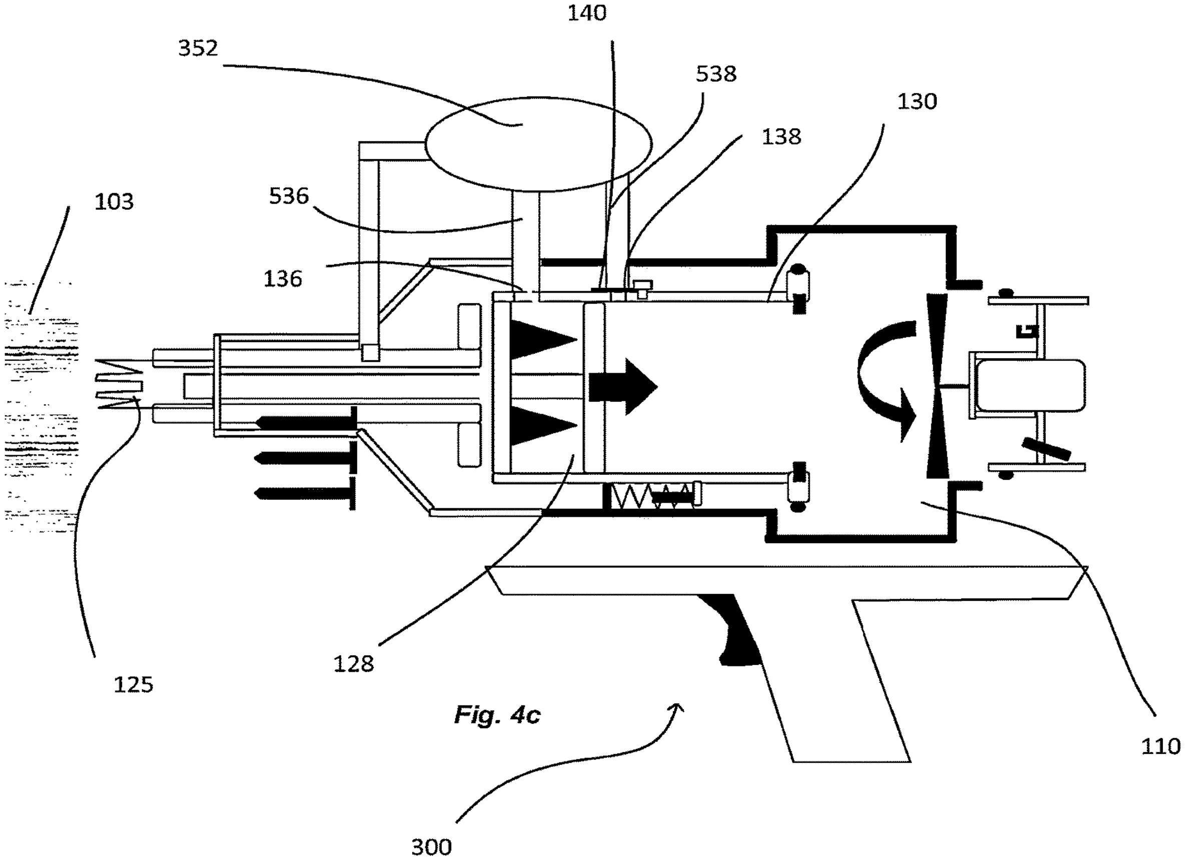

The one way valve 140 prevents the flow of the gases from the return chamber 352 to the combustion chamber 110 via the first channel 358. As shown in FIG. 4*c*, and as described above, the fastener 102 is expelled from the device 300 via engagement with the drive blade 134 when the piston 128 is in the second position. In this example, the recoil of the fastener driving device 300 acts to slide the combustion chamber 110 away from the combustion mechanism, thereby opening the combustion chamber 110. The opening of the combustion chamber 110 allows for combustion gases to be exhausted. After the fastener 102 has been discharged, gases within the return chamber 352 flow into the sleeve 130 (and not the combustion chamber 110) via the vent 136 as indicated by the arrow. As the combustion chamber housing 112 has opened and combustion gases are exhausted, gas pressure in combustion chamber 110 is reduced. The force applied to the piston 128 by the pressurised gas within the return chamber 352 exceeds that applied to the piston by the residual gas pressure in the combustion chamber 110 and so piston 128 is driven back to the first position. As gases in the return chamber are compressed to a higher pressure than for a conventional positive air return system, the pressure differential across piston 128 is larger and so the biasing force applied to piston 128 is greater and so its return from the second position to the first position is more reliable. The return of piston 128 to the first position may be faster than for the positive air return system described with reference to FIG. 3. Additionally, in the event that the recoil does not open the combustion chamber 110 the pressurised gases in the return chamber 352 may still suffice to overcome the pressure of the cooling gases in the combustion chamber 110 to return the piston 128, thereby reducing the risk of a blank fire in the next shot.

Figure 4D:
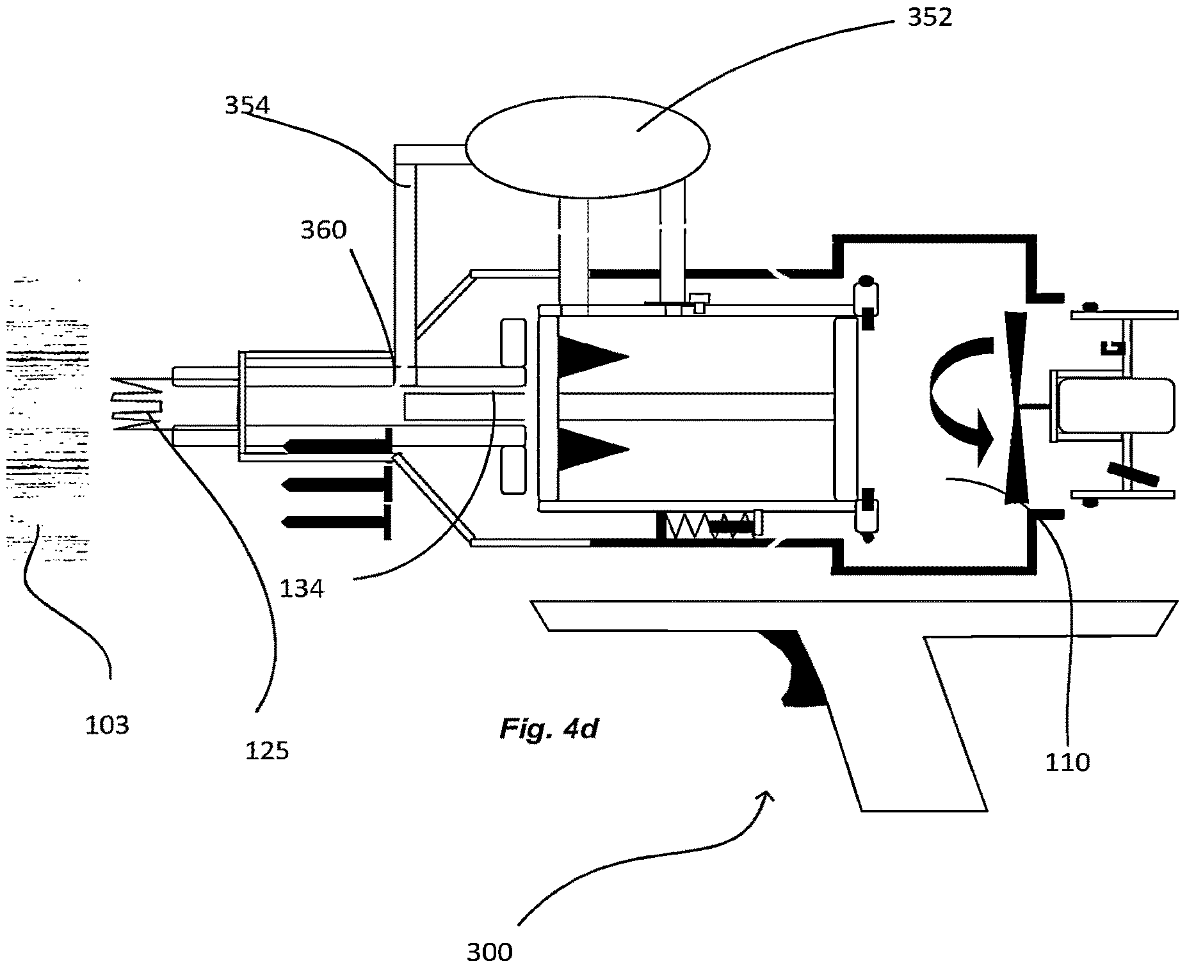

Turning to FIG. 4*d*, firstly this shows the combustion gases being exhausted from the open combustion chamber 110 as indicated by the arrows. Secondly, FIG. 4*d* illustrates that in some examples the return chamber 352 may also include a nose leak channel 354. The nose leak channel 354 fluidly connects the return chamber 352 to the fastener channel 124. In this example the fastener channel 124 includes a nose vent 360 which links to the nose leak channel 354. In other examples the nose leak channel 354 may be fluidly connected to the fastener channel 124 via a vent in the probe 126. When the piston 128 is in the first position, the drive blade 134 extends partially into the fastener channel 124 and when the piston 128 is in the second position the drive blade 134 extends further into the fastener channel 124. The nose vent 360 is positioned on the fastener channel 124 such that the nose vent 360 is open when the piston 128 is in the first position and closes when the piston 128 slides from the first position to the second position.

Once the drive blade 134 of the piston passes the nose vent 360 as the piston returns to the first position, the nose vent 360 is opened. Opening of the nose vent 360 allows for the venting of any excess pressurized gas from within the return chamber 352 via the nose leak channel 354. The return chamber 352 therefore may be returned to atmospheric pressure between firings of the fasteners 102. The exhaustion of the return chamber 352 via the nose leak system reduces the pumping effect and so prevents the build up of a pressure differential between the sleeve 130 and the return chamber 352 which could stop the next fastener from firing correctly. The pumping effect is a continual increase of pressure in the return chamber after each shot. Similarly, the nose leak channel 354 prevents the back pressure applied on the piston 128 during the shot from increasing, as otherwise this risks a decrease in the energy which drives the fastener 102 from the device 100. The nose leak channel 354 allows the driving force of the fastener driving device to remain consistent. This allows for reliable and repeatable fastener firing.

In other examples the drive blade 134 may be shaped such that when the piston 128 is in the first position a space between the drive blade 134 and the base of the sleeve 130 is opened. This space thus allows for pressure equalization in the sleeve 130 and return chamber 352 after firing the fastener 102 by gas escaping from the sleeve 130 past the drive blade 134 directly into the fastener channel 124. For example, the drive blade 134 may include a tapered portion with a smaller diameter than the rest of the drive blade 134. The tapered portion may be positioned towards the end of the drive blade 134 which engages the fastener 102. Other examples may include a separate valve system attached to the return chamber 352 to directly vent the pressure from the return chamber 352 to the exterior of the device after firing.

The positive air return system 350 may be smaller than conventional positive air return systems because the heated gases entering from the combustion chamber allows for increased pressurisation of the gases within the return chamber 352.

Figure 5A:
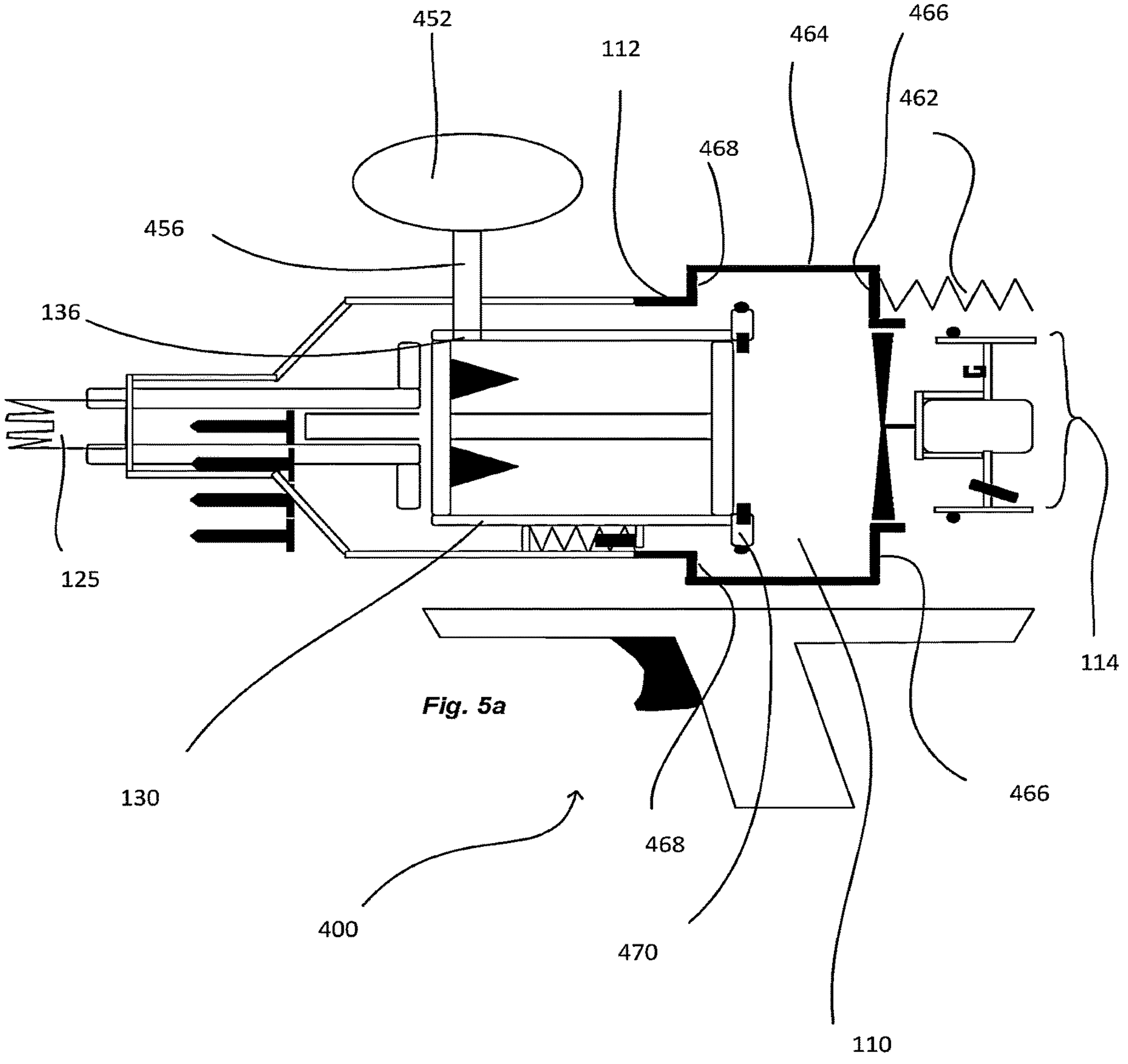
FIGS. 5*a* to 5*g* illustrate schematic views of a fastener driving device according to a second example of the present disclosure.

Referring now to FIG. 5*a* a fastening device 400 according to a second example of the present disclosure is shown. For brevity the features of the fastener driving device 400 which are the same as is described above will not be described again. In this example at least part of the combustion chamber housing 112 of the combustion chamber 110 is configured to move because of combustion gas expansion. This is in addition to movement of the combustion chamber housing 112 via depression of the work contact element 125, transmitted to the combustion chamber housing 112 via the probe 126. The shape of the combustion chamber housing 112 is modified in a moveable housing portion 464 so that gas pressure acts upon it to move in a first direction (to the right in FIG. 5*a*). That is the combustion chamber housing 112 includes a biased wall portion 466, which is configured to move in a first direction (to the right) as combustion gases expand within the combustion chamber 110. In this example, the first direction is towards the combustion mechanism 114 and perpendicular to the first surface 466.

In this example, the moveable housing portion 466 comprises a surface 466 which is opposite a second surface 468 of the combustion chamber 110. The surface 466 has a larger surface area than the opposed surface 468 of the combustion chamber 110. In this way, the expanding combustion gases provide a larger force on the first surface 466 than the second surface 468, causing the moveable housing portion 464 to move in the first direction as is illustrated in FIG. 5*c*.

In this example the fastener driving device 400 includes a positive air return system 450 including a return chamber 452 which is in communication with a channel 456 and the vent 136. The positive air return system 450 may be the same as the first example of the present disclosure described above in connection with FIGS. 4*a* to 4*d*.

Figure 5B:
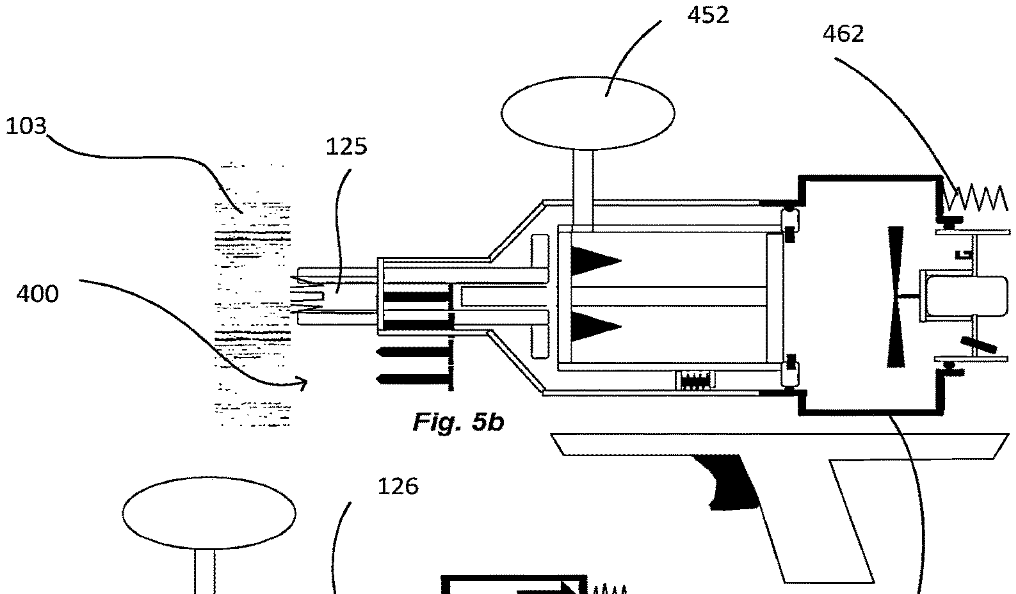
Figure 5C:
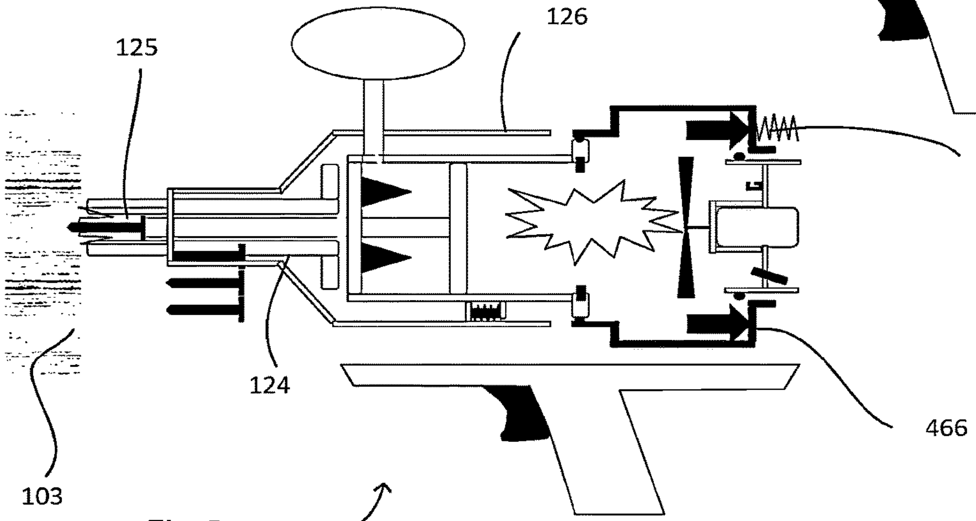

FIG. 5*b* shows the device 400 with work contact element 125 pressed against external surface 103. Pushing the work contact element 125 against the external surface 103 moves the probe 126 to contact the moveable housing portion 464. As discussed with reference to FIG. 2*b*, the pressure from work contact element 125 moving toward the nose sleeve 124 means the probe 126 slides combustion chamber 110 in the first direction. However, differing from the examples given earlier, the probe 126 is separate from the combustion chamber housing 112 rather than being attached or integrally formed. That is, the probe 126 contacts the combustion chamber housing 112 and pushes it towards the rights as the work contact element 125 is depressed. In particular, the moveable housing portion 464 is contacted by the probe 126 and pushed in the first direction such that the combustion chamber 110 is sealed (substantially as previously described). In this example, the sleeve 130 includes a seal ring 470 around its periphery. When the combustion chamber 110 is slid partially in the first direction (due to pressing the work contact element 125 against an external surface) the combustion chamber housing 112 contacts the seal ring 470. The combustion chamber 110 thus forms a sealed chamber with the combustion mechanisms 114 and the sleeve 130.

As before, when the combustion chamber 110 is sealed the fan 120 starts and fuel is injected into the combustion chamber 110 and dispersed by the fan 120. When the trigger 106 is pressed the spark plug 118 ignites the fuel.

As shown in FIG. 5*c* the expansion of the combustion gases further slides the combustion chamber 110 in the first direction due to the forces acting on the surface 466 of the moveable housing portion 464. The unbalanced surface areas of the surface 466 of the moveable housing portion 464 compared to the surface 468 means the force acting on surface 466 of the moveable housing portion 464 is greater than that acting on the opposed surface 468. Therefore the moveable housing portion 464 slides further to the right (in a direction perpendicular to the first surface 466). The combustion chamber 110 therefore moves away (and separates) from the probe 126 (to the right in the figures).

The fastener driving device 400 includes a biasing element 462 (for instance, a spring) which acts to bias the moveable housing or wall portion 464 in a second direction (to the left), opposite the first direction. During combustion the force of the expanding gases is sufficient to overcome the opposing force of the biasing element 462. The expansion of the combustion gases also slides the piston 128 from the first position to the second position, thereby firing the fastener 102 from the device 400 (as previously described). The biased wall portion 464 is configured such that expansion of the combustion gases causes the combustion chamber 110 to open (by continued sliding movement to the right) only after the fastener 102 has been fired from the fastener driving device 400. The gases from the sleeve 130 may be held in the return chamber 452 during firing, as discussed with reference to FIG. 3.

The expansion of the combustion gases causes the moveable housing portion 464 of the combustion chamber 110 to continue moving in the first direction. The moveable housing portion 464 therefore continues to move away from the probe 126, creating a space between the probe 126 and the biased wall portion 464. Once the biased wall portion 464 has slid beyond the seal ring 470, an opening in the combustion chamber 110 is created, though which combustion gases can escape as shown by the arrows in FIG. 5*d*.

Figure 5D:
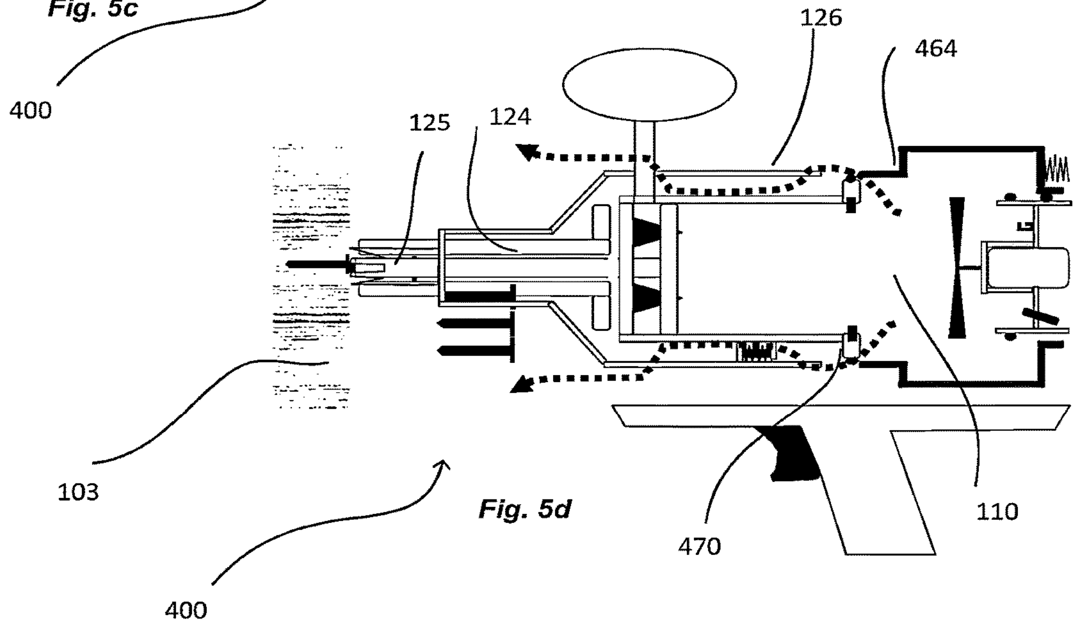
Figure 5E:
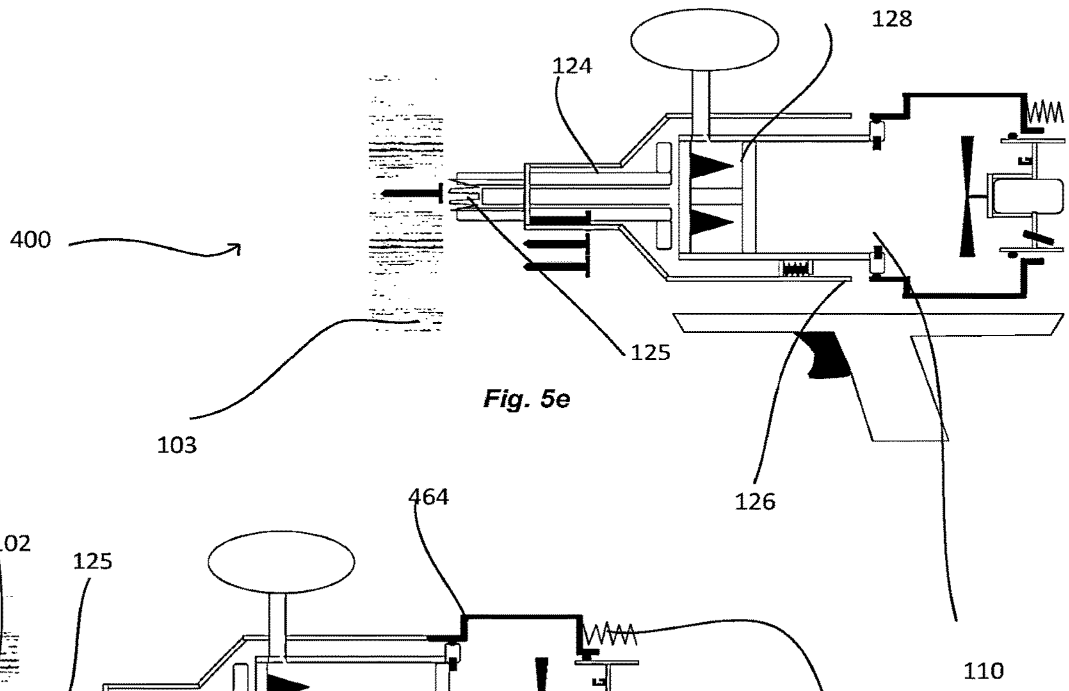
Figure 5F:
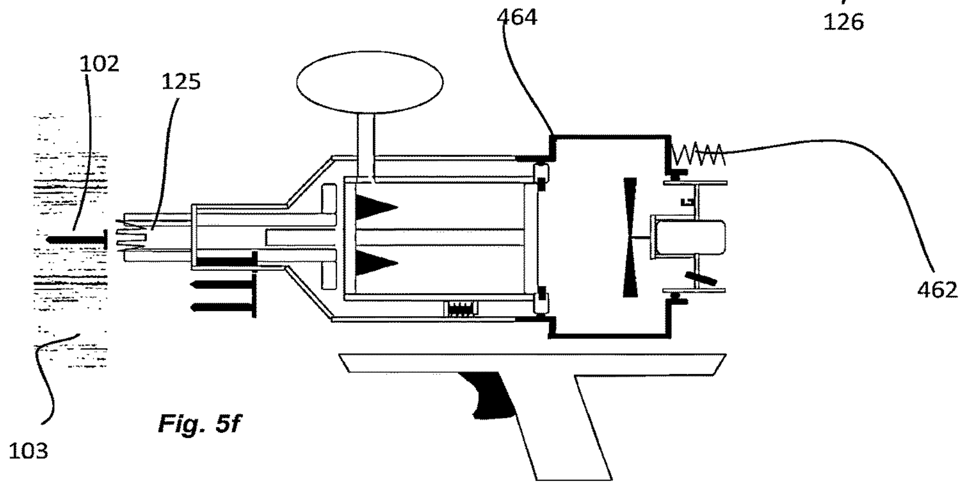
Figure 5G:
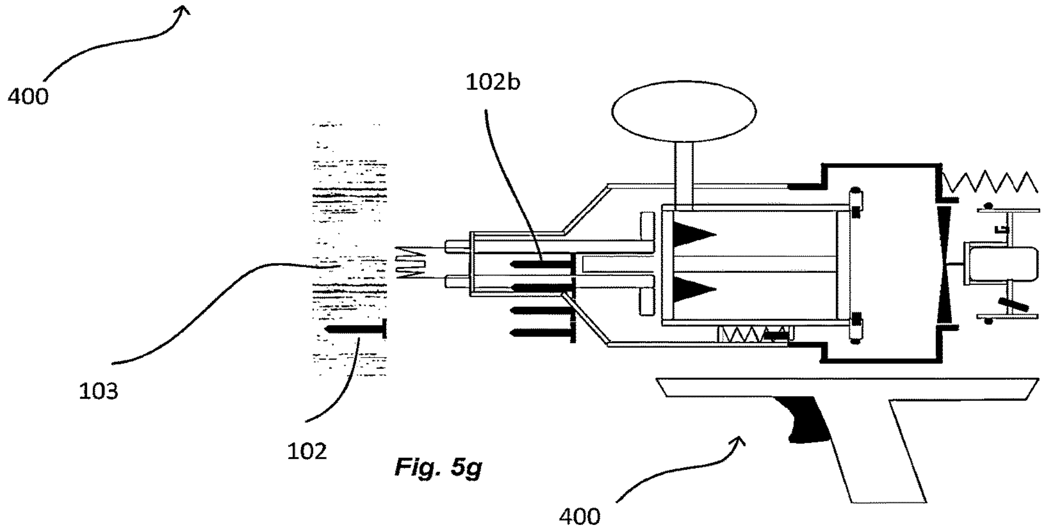

As shown in FIGS. 5*e* and 4*f* once the combustion chamber 110 is no longer sealed and the combustion gases have escaped as shown in FIG. 5*d*, gas pressure in the combustion chamber 110 rapidly reduces. Once the pressure has sufficiently reduced, the biasing element 462 provides sufficient force to return the moveable housing portion 464 to the initial position as shown in FIG. 5*g*. This movement to the initial position causes the moveable housing portion 464 to contact the probe 126 which in turn pushes the work contact element 125 from the device. The piston 128 is returned to the first position due to the pressure built up in the return chamber 452.

The next fastener 102*b* is drawn in to the fastener channel 124 and the fastener driving device 400 is ready to fire a second shot.

In some embodiments the fastener driving device 400 may include the positive air return system 350 as described above with reference to FIGS. 4*a* to *d*. For example, the fastener driving device 400 may include a channel connecting an exhaust with a one-way valve in the sleeve 130 and the return chamber 452. Optionally a nose leak channel between the return chamber 452 and fastener channel 124 could also be included. In these examples, some of the gases from the combustion chamber 110 may move into the return chamber 452 via an exhaust with a one-way valve and channel (as shown in FIG. 4*b*) during expansion of the combustion gas once the piston 128 has moved toward the second position. Then, after combustion, the mixture of combustion gases and gases from the sleeve 130 which are held in the return chamber 452 act to bias the piston 128 to return.

Using gas pressure in the combustion chamber 110 to manage the combustion chamber 110 movement makes the movement independent of external conditions. This reduces risk of misfiring and also can improve the time between each shot. Further, the depressurisation of the combustion chamber 110 improves the return of the piston 128 to the first position as the biasing force from the return chamber 452 has less force to overcome. Once the shot has been fired the opening of the housing can be controlled by controlling the mass of the combustion chamber 110 compared to the force generated by the biasing mechanisms. For example, opening the combustion chamber housing 112 after 20 ms ensures that combustion gas pressure is maintained in the combustion chamber for a sufficient prior of time to ensure that the fastener is correctly driven from the device. Furthermore, keeping the combustion chamber closed until after the combustion is complete and the nail is driven reduces noise emitted from the device by keeping the combustion chamber 110 closed during gas combustion. To achieve this time a combustion chamber mass of 500 g and a spring force of 15 N has been found to be effective. Other parameters such as the ratio of the first surface 466 to the second surface 466 of the biased wall portion 464 can also be altered to determine the shot timings.

The above described embodiments provide the advantage that the fastener device has an improved piston return compared to the prior art. For example, the speed of the piston return may be increased, or the chance of piston rebound may be reduced or negated entirely.

Throughout this specification, the words "comprise" and "contain" and variations of them mean "including but not limited to", and they are not intended to (and do not) exclude other components, integers or steps. Throughout this specification, the singular encompasses the plural unless the context otherwise requires. In particular, where the indefinite article is used, the specification is to be understood as contemplating plurality as well as singularity, unless the context requires otherwise. Throughout this specification, the term "about" is used to provide flexibility to a range endpoint by providing that a given value may be "a little above" or "a little below" the endpoint. The degree of flexibility of this term can be dictated by the particular variable and can be determined based on experience and the associated description herein.

Features, integers or characteristics described in conjunction with a particular aspect or example of the present disclosure are to be understood to be applicable to any other aspect or example described herein unless incompatible therewith. All of the features disclosed in this specification, and/or all of the steps of any method or process so disclosed, may be combined in any combination, except combinations where at least some of such features and/or steps are mutually exclusive. The present disclosure is not restricted to the details of any foregoing examples. The present disclosure extends to any novel feature or combination of features disclosed in this specification. It will be also be appreciated that, throughout this specification, language in the general form of "X for Y" (where Y is some action, activity or step and X is some mechanism for carrying out that action, activity or step) encompasses mechanisms X adapted or arranged specifically, but not exclusively, to do Y.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A fastener driving device comprising:
a combustion chamber;
a piston coupled to the combustion chamber and slidable within a sleeve such that combustion gas expansion in the combustion chamber causes the piston to slide from a first position to a second position;
a fastener channel configured to receive a fastener, wherein when moving from the first position to the second position, the piston is configured to engage the fastener and drive the fastener through the fastener channel and from the fastener driving device;
a first vent;
a return chamber configured to receive gas from the sleeve via the first vent;
a second vent coupled to the return chamber and configured to supply combustion gas from the combustion chamber to the return chamber; and
a nose leak channel configured to fluidly connect the return chamber to the fastener channel.

2. The fastener driving device of claim 1, wherein the second vent includes a one-way valve such that gas from the return chamber is prevented from returning from the return chamber via the second vent.

3. The fastener driving device of claim 2, wherein at least one of the first and second vents are connected to a channel coupling the sleeve to the return chamber.

4. The fastener driving device of claim 3, which is configured such that when the piston moves from the first position to the second position, gas pressure within the return chamber is increased.

5. The fastener driving device of claim 4, wherein the piston is configured such that in the first position the nose leak channel is open and in the second position the nose leak channel is closed.

6. The fastener driving device of claim 5, wherein the piston comprises a plate configured to abut an interior wall of the sleeve and a drive blade extending from the plate into the fastener channel to engage the fastener.

7. The fastener driving device of claim 6, wherein the first and second vents are spaced apart on the sleeve such that when the piston moves towards the second position, the piston slides past the second vent before reaching the first vent.

8. The fastener driving device of claim 1, wherein at least one of the first and second vents are connected to a channel for coupling the sleeve to the return chamber.

9. The fastener driving device of claim 1, wherein when the piston moves from the first position to the second position, gas pressure within the return chamber is increased.

10. The fastener driving device of claim 1, wherein the return chamber is fluidly connected to the fastener channel via a nose leak channel, and wherein the piston is configured such that in the first position the nose leak channel is open and in the second position the nose leak channel is closed.

11. The fastener driving device of claim 1, wherein the piston comprises a plate configured to abut an interior wall of the sleeve and a drive blade extending from the plate into the fastener channel to engage the fastener.

12. The fastener driving device of claim 1, wherein the first and second vents are spaced apart on the sleeve such that when the piston moves towards the second position, the piston slides past the second vent before reaching the first vent.

* * * * *